US012688504B2

(12) United States Patent
Coetzee

(10) Patent No.: US 12,688,504 B2
(45) Date of Patent: Jul. 21, 2026

(54) HIDDEN FACTOR AUTHENTICATION

(71) Applicant: BPI SOLUTIONS MANAGEMENT (PTY) LTD, Cape Town (ZA)

(72) Inventor: Johan Louw Coetzee, Cape Town (ZA)

( * ) Notice: Subject to any disclaimer, the term of this patent is extended or adjusted under 35 U.S.C. 154(b) by 26 days.

(21) Appl. No.: 18/490,202

(22) Filed: Oct. 19, 2023

(65) Prior Publication Data

US 2024/0242216 A1    Jul. 18, 2024

Related U.S. Application Data

(60) Provisional application No. 63/439,694, filed on Jan. 18, 2023.

(51) Int. Cl.
G06Q 20/40 (2012.01)
(52) U.S. Cl.
CPC ..... G06Q 20/4014 (2013.01); G06Q 20/4012 (2013.01); G06Q 20/4016 (2013.01)
(58) Field of Classification Search
CPC .......... G06Q 20/4014; G06Q 20/4012; G06Q 20/4016; G06Q 20/385; G06Q 20/386; G06F 21/31
See application file for complete search history.

(56) References Cited

U.S. PATENT DOCUMENTS

| | | | | |
|---|---|---|---|---|
| 8,578,454 B2 * | 11/2013 | Grim | ..................... | H04W 12/50 |
| | | | | 713/168 |
| 11,657,389 B2 * | 5/2023 | Eng | ..................... | G06Q 20/385 |
| | | | | 705/44 |
| 12,126,765 B1 * | 10/2024 | Dziuk | ..................... | H04M 1/56 |
| 2018/0124033 A1 * | 5/2018 | Greenspan | .............. | G06F 21/31 |
| 2019/0220580 A1 * | 7/2019 | Brison | .................. | G06F 21/552 |
| 2022/0270174 A1 * | 8/2022 | Quaintance | ........... | H04L 9/0863 |
| 2023/0195432 A1 * | 6/2023 | Balciunas | ............. | G06F 16/951 |
| | | | | 717/106 |
| 2024/0250942 A1 * | 7/2024 | Miel | ................... | H04L 63/1433 |

* cited by examiner

*Primary Examiner* — Maher N Algibhah
(74) *Attorney, Agent, or Firm* — Stevens Patent Law LLC; James Stevens

(57) ABSTRACT

The invention provides a user verification system to verify whether a user of a secure system is authorised to access the secure system. The user verification system comprises one or more processors and one or more computer memory storage means; stored instructions on the memory storage means for controlling the processor, to create a user profile for a user, which profile input fields require first address such as an email address and second address such as a cellular telephone number; and stored instructions on the memory storage means for controlling the processor, to login to the secure system and which secure system is set up to send a login verification means to the first or second address in the form of a hidden response request.

16 Claims, 7 Drawing Sheets

| | |
|---|---|
| Name: | XXXXX |
| Surname: | Xxxxx |
| Username: | Xxxxx |
| Primary Login Email: | John@xxx.com |
| OTP Hidden Address: | Johnsecured@Finance.com |
| Hidden Address Authentication: | |
| 1.  New Beneficiary Approval | Yes / No |
| 2.  Update Beneficiary Approval | Yes / No |
| 3.  Payments | Yes / No |
| 4.  Credit Card Transactions | Yes / No |
| 5.  Password Reset: | Yes / No |
| 6.  User Verification: | Yes / No |

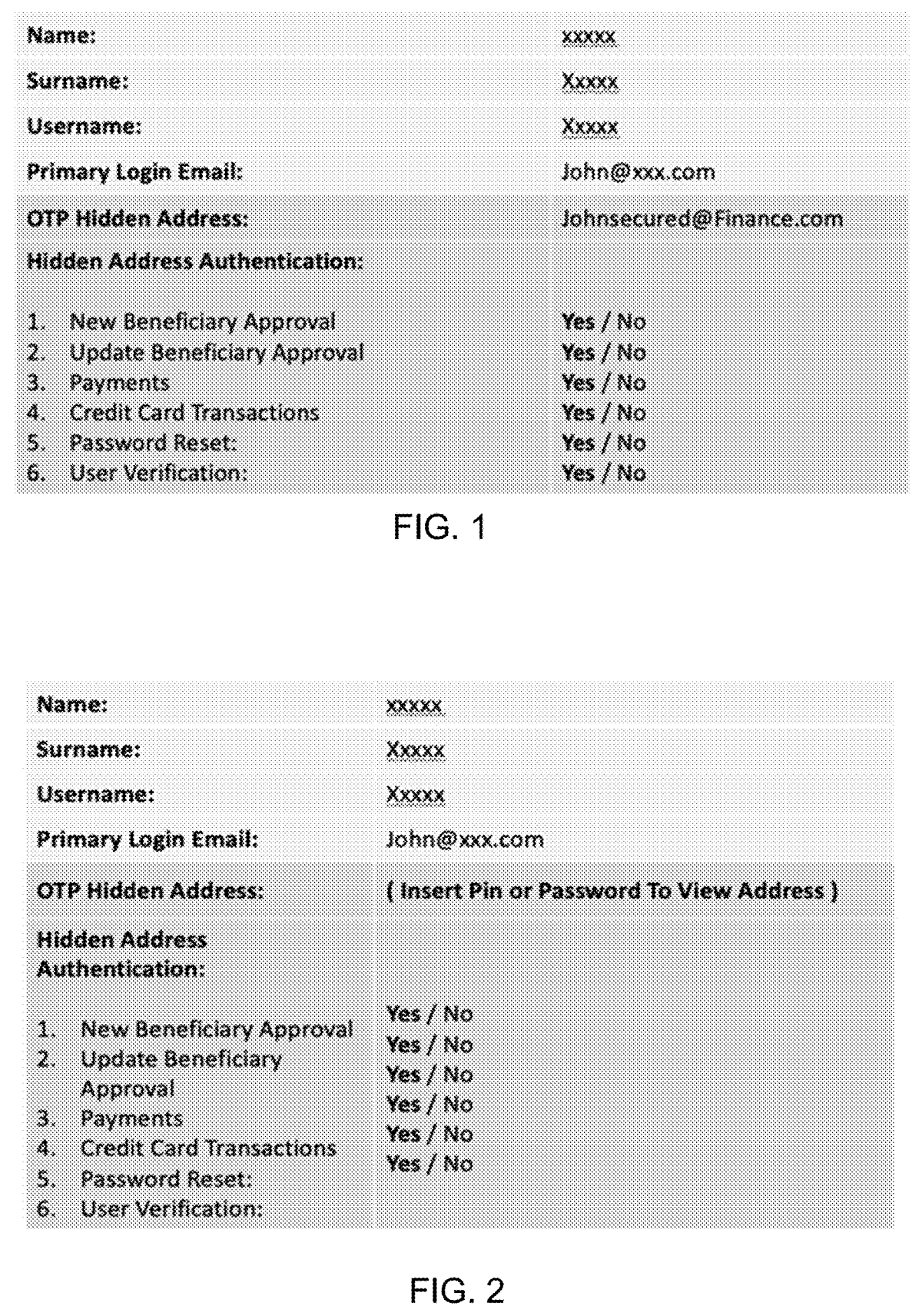

Name: xxxxx

Surname: Xxxxx

Username: Xxxxx

Primary Login Email: John@xxx.com

OTP Hidden Address: Johnsecured@Finance.com

Hidden Address Authentication:

1. New Beneficiary Approval     Yes / No
2. Update Beneficiary Approval     Yes / No
3. Payments     Yes / No
4. Credit Card Transactions     Yes / No
5. Password Reset:     Yes / No
6. User Verification:     Yes / No

FIG. 1

Name: xxxxx

Surname: Xxxxx

Username: Xxxxx

Primary Login Email: John@xxx.com

OTP Hidden Address: ( Insert Pin or Password To View Address )

Hidden Address Authentication:

1. New Beneficiary Approval     Yes / No
2. Update Beneficiary Approval     Yes / No
    Yes / No
3. Payments     Yes / No
4. Credit Card Transactions     Yes / No
5. Password Reset:     Yes / No
6. User Verification:

FIG. 2

| | |
|---|---|
| Name: | xxxxx |
| Surname: | Xxxxx |
| Username: | Xxxxx |
| Primary Login Email: | John@xxx.com |
| Hidden Address Authentication: | |
| 1. New Beneficiary Approval | FinanceManager@business.com |
| 2. Update Beneficiary Approval | FinanceDirector@business.com |
| 3. Payments | FinanceManager@business.com |
| 4. Credit Card Transactions | FinanceManager@business.com |
| 5. Password Reset: | Primary Email |
| 6. User Verification: | Primary Email |

FIG. 3

| | |
|---|---|
| Name: | xxxxx |
| Surname: | Xxxxx |
| Username: | Xxxxx |
| Primary Login Email: | John@xxx.com |
| Hidden Address Authentication: | |
| 1. New Beneficiary Approval | ( Insert Pin or Password To View Address ) |
| 2. Update Beneficiary Approval | ( Insert Pin or Password To View Address ) |
| 3. Payments | ( Insert Pin or Password To View Address ) |
| 4. Credit Card Transactions | ( Insert Pin or Password To View Address ) |
| 5. Password Reset: | ( Insert Pin or Password To View Address ) |
| 6. User Verification: | ( Insert Pin or Password To View Address ) |

FIG. 4

| Company ID: | 1234 |
|---|---|
| Company Name: | Finance |
| Transaction Approvals: | |
| Delegation 1: | FinanceManagerSecured@Finance.com |
| Amount: | = 0 – 100 000 usd |
| Delegation 2: | FinanceDirectorSecured@Finance.com |
| Amount: | > 100 000 usd |
| Delegation 3: | CEOSecured@Finance.com |
| Amount: | > 1M usd |

FIG. 5

| Company ID: | 1234 |
|---|---|
| Company Name: | Finance |
| Transaction Approvals: | |
| Delegation 1: | ( Insert Pin or Password To View Address ) |
| Amount: | = 0 – 100 000 usd |
| Delegation 2: | ( Insert Pin or Password To View Address ) |
| Amount: | > 100 000 usd |
| Delegation 3: | ( Insert Pin or Password To View Address ) |
| Amount: | > 1M usd |

FIG. 6

| Name: | xxxxx |
| Surname: | Xxxxx |
| Username: | Xxxxx |
| Primary Login Email: | John@xxx.com |
| OTP Hidden Address: | ( Exchange Wallet, Crypto Wallet, Central Bank Digital Wallet, Stable Coin Address Or Authentication App/Link ) |
| Hidden Address Authentication: | |
| 1. New Beneficiary Approval | Yes / No |
| 2. Update Beneficiary Approval | Yes / No |
| 3. Payments | Yes / No |
| 4. Credit Card Transactions | Yes / No |
| 5. Password Reset: | Yes / No |
| 6. User Verification: | Yes / No |

FIG. 7

| Name: | xxxxx |
| Surname: | Xxxxx |
| Username: | Xxxxx |
| Primary Login Email: | John@xxx.com |
| OTP Hidden Address: | ( Insert Pin or Password To View Address ) |
| Hidden Address Authentication: | |
| 1. New Beneficiary Approval | Yes / No |
| 2. Update Beneficiary Approval | Yes / No |
| 3. Payments | Yes / No |
| 4. Credit Card Transactions | Yes / No |
| 5. Password Reset: | Yes / No |
| 6. User Verification: | Yes / No |

FIG. 8

| Name: | xxxxx |
|---|---|
| Surname: | Xxxxx |
| Username: | Xxxxx |
| Business: | Company 1234 |
| Delayed Authentication: | |
| 1. Primary Email (1$^{st}$ OTP) | ( Insert Pin or Password To View Address ) |
| 2. Delay: | 15 Min |
| 3. Hidden Address (2$^{nd}$ OTP) | ( Insert Pin or Password To View Address ) |

FIG. 10

| Name: | xxxxx |
|---|---|
| Surname: | Xxxxx |
| Username: | Xxxxx |
| Business: | Company 1234 |
| Delayed Authentication: | |
| 1. Primary Email (OTP) | ( Insert Pin or Password To View Address ) |
| 2. Delay (Before The Password Is Reset) | 15 Min |
| 3. Hidden Address (Notification) | ( Insert Pin or Password To View Address ) |

FIG. 11

| Name: | xxxxx |
|---|---|
| Surname: | Xxxxx |
| Username: | Xxxxx |
| Business: | Company 1234 |
| Delayed Authentication: | |
| 1. Primary Email (1$^{st}$ OTP) | ( Insert Pin or Password To View Address ) |
| 2. Delay: | 15 Min |
| 3. Hidden Address (2$^{nd}$ OTP) | ( Insert Pin or Password To View Address ) |

FIG. 12

| Name: | xxxxx |
|---|---|
| Surname: | Xxxxx |
| Username: | Xxxxx |
| Business: | Company 1234 |
| Delayed Authentication: | |
| 1. Primary Email (OTP) | ( Insert Pin or Password To View Address ) |
| 2. Delay (Before Payment Is Processed) | 15 Min |
| 3. Hidden Address (Notification) | ( Insert Pin or Password To View Address ) |

FIG. 13

HIDDEN FACTOR AUTHENTICATION

PRIORITY CLAIM

The present application claims priority to and the benefit of U.S. Provisional Patent Application Ser. No. 63/439,694, filed on Jan. 18, 2023, the entirety of which is incorporated herein by reference.

TECHNICAL FIELD

This invention relates to the financial industry and is an enhancement to a business or users' profile in order to protect them from fraudulent or criminal activities.

BACKGROUND

The inventor is aware of the two-step (first and second factors) user verification process that is the industry standard which is used to log into financial systems and other systems requiring one or two factor verification. The user or business can be compromised as their username, password, primary email, and primary phone number are exposed across multiple platforms. The user or business normally does not have the ability to change their primary phone or email which makes them vulnerable to criminals. Should a criminal be in possession of a cloned sim card of a person and the normally easily obtainable email address of that person the criminal will be able to react on both steps to log in or do a password reset and obtain instant access to such accounts of that person. This invention also prevents a criminal from gaining instant access to a user's profile or the ability to instantly process a payment if they have gained unlawful access to their primary email and phone number.

Disadvantages of the 2-Step Verification Process (Global Standard):

1. Social Engineering: Attackers can use social engineering techniques to trick users into revealing both their password and the second factor. This could involve impersonating an authority figure or manipulating users into disclosing their credentials.
2. Phishing: Phishing attacks can trick users into providing their second factor to a malicious website or app. If users aren't careful, they might inadvertently give away their credentials.
3. SIM Swapping: Attackers can convince a mobile carrier to transfer a victim's phone number to a new SIM card under their control, intercepting the second-factor codes sent via SMS or calls.
4. Single Point of Failure: If the chosen second factor is compromised (e.g., using the same password for multiple services or reusing the same phone number for multiple accounts), an attacker could gain access to multiple accounts.
5. Limited Options: Relying solely on SMS or email for the second factor might not be as secure as other methods like app-generated codes or hardware tokens.
6. Account Recovery: In some cases, attackers might use weak account recovery processes to gain access to an account, even if a 2-Step Verification is enabled.

Problems this Invention Aims to Solve

1. Improving cyber security for banks, businesses, high net worth individuals or the larger community.
2. Protecting businesses and banks against phishing attacks.

3. Protecting payment and credit card transactions.
4. Verifying a user's identity for financial institutions.
5. Protecting the reset password function and preventing a hacker from gaining access to a user's profile or taking over their profile for extortion or malicious activity.
6. Preventing criminals from gaining instant access to a user's profile or the ability to instantly process a payment.

The inventor is also aware that cumbersome or time-consuming verification procedures are not normally adopted in the mainstream. This problem is addressed in U.S. Pat. No. 8,578,454. However security is compromised through the instant access gained through the 2-step verification process, which is not suitable for high-risk security situations. It is an object of the invention to provide a verification system with increased security, while maintaining a balance between ease of use and security risks.

SUMMARY

According to the invention there is provided a user verification system to verify whether a user of a secure system is authorised to access the secure system, which user verification system comprises:

one or more processors and one or more computer memory storage means;

stored instructions on the memory storage means for controlling the processor, to create a user profile for a user, which profile input fields require a first address such as an primary email address and second address such as a cellular telephone number; and stored instructions on the memory storage means for controlling the processor, to login to the secure system and which secure system is set up to send a login verification request to the first address and a login verification request to the second address in the form of a hidden response request.

The system may also comprise a means to reset the user profile details or login details, in the form of stored instructions on the memory storage means for controlling the processor, and which secure system is set up to send a reset verification means to one of the addresses and a reset verification means to the other address in the form of a hidden response request.

A hidden response request will be understood to mean that, when a person or user is attempting to log into a system, the login interface will not reveal or show the means used to send a hidden response request or the address for a hidden response request. Once set up by a under on his user profile, the hidden aspect will only be visible when the verified user is logged in via the hidden response request.

In some embodiments, the login interface may be set up to not show that a hidden response request has been sent or that the system is using such a means.

In addition, the hidden response request may be a time-out response request. A time-out response request will be understood to be a verification message sent to the user which comprises a notification of a login attempt and which requests an action or inaction by the user within a pre-set timed limit to either confirm or refuse authorisation to login to a secure system.

In addition, the hidden response request may be sent in addition to typical known and visible verification steps or response requests.

The response request may be sent to an address of a cellular device and may be in the form of an email, a mobile application notification and/or request for verification, or a message which comprises an OTP (one time pin), or the like.

The above verification system will be effective even if the criminal is in possession of the cellular number and knows the password and email. However, if the criminal receives the user's hidden address as well, the system will be compromised however, the use of the hidden verification request may be hidden and the address will be hidden from view and encrypted. This address can be updated at any time to avoid a criminal from gaining access if the address was compromised.

The profile input fields of the means to create a user profile for a user may be configured to require or provide the option to enter a second address, the first address being the primary address, and the login interface is then preferably configured to not display the second address or use thereof during the login procedure.

The user verification system to verify whether a user of a secure system is authorised to access the secure system comprises a means, in form of stored instructions on the memory storage means for controlling the processor, to login to the secure system and which secure system is set up to send a third login verification means in the form of a second response request email to the second hidden address. The user verification system may be configured to delay the second request email.

The login verification means may be in the form of a one-time pin (OTP), or a verification, confirmation or rejection button which is configured send a verification, confirmation or rejection signal to the login means to verify, confirm or reject the login. The user can click the verification, confirmation or rejection button, to either confirm or reject the login attempt, upon which the secure system allows the login to proceed or fail. Inaction by the user within a pre-set time lapse will automatically fail any login attempt. The pre-set time lapse can be used to delay the login procedure or the verification email to the second address may, instead, be delayed for a pre-set time period.

The verification system may also be configured to verify other transactions requiring security and verification of a user such as bank payments, credit card payments or bank or credit card payments above a certain pre-set amount. The hidden address can be used to authorise a financial transaction.

It is to be appreciated that such a verification system is customisable by the user or the system to not place an undue administration burden or cause an undue time delay during log in or password reset procedures and, if so, such a burden or delay must be balanced against the security risk and be customisable to suit the user.

The verification system will typically comprise an authentication service, which may be part of the secure service or may be provided by a third party and hosted on third party server.

The verification system may also comprise or be connected to a server loaded with a database which comprises a list of compromised user contact details or suspicious IP addresses or features such a login location used by criminals to access user information. The verification system may then be configured to compare user information entered on the user's profile to see if any of the information has been flagged for suspicious activity or for being previously compromised. If found to be flagged, the user may be notified and the means to create a user profile for a user may then be configured to be triggered to require the input or suggest the input of a hidden address to strengthen the security, or any other process can be applied to mitigate security risks.

The hidden address may be used as a notification means to issue notifications to the user, which notifications comprise reject or approval requests, new password requests, resetting or changing the password, compromise of private information alerts and the like. The hidden address may also be used to send a pin, OTP, seed phrase, random words, letters, special characters, or combinations as part of the verification or password change or resetting process. It is preferable that a pin or similar is also sent or the first or primary email.

The login page of the login verification means may be configured to only display the hidden address after a verification process as described above has been completed or a pin has been entered, and only for a single session.

The verification system may preferably also comprise a means, in form of stored instructions on the memory storage means for controlling the processor, to customise the verification steps and/or requirements to allow a user to balance the ease of use with perceived security risks related to different types of transactions and prior compromised contact details.

The system may be configured for web accessed systems and mobile device applications.

The invention also extends to a method for verifying whether a user of a secure system is authorised to access the secure system, which method comprises the steps of:

creating a user profile for a user, which profile input fields require a hidden address and a cellular telephone number; and sending a login verification means to a cellular device of the user and sending a login verification means to the hidden address; or sending reset verification means to a cellular device of the user and sending a reset verification means to the hidden address.

The method may comprise the step of requesting the user during account profile creation to enter and store a hidden address and not displaying the hidden address or use thereof at an associated login page of the associated account.

The method may comprise the step of comparing contact information such a cell phone numbers and emails entered during account profile creation to a database of known compromised or hacked contact information.

The invention also extends to a non-transitory computer-readable medium including one or more sequences of instructions which, when executed by one or more processors, causes said one or more processors to perform the method as described above.

This solution is an improvement to the 2-step verification process as it allows a user or business to send the one-time pin to hidden location and provides a user or business to quickly change the location of that address if his private information has been compromised.

BRIEF DESCRIPTION OF THE FIGURES

FIG. 1 illustrates adding an address to a profile, according to an example embodiment of the present disclosure.

FIG. 2 illustrates hiding the address of FIG. 1 from view, according to an example embodiment of the present disclosure.

FIGS. 3 and 4 illustrate the use of multiple hidden addresses, according to an example embodiment of the present disclosure.

FIGS. 5 and 6 illustrate that multiple users can be added to a user's profile, according to an example embodiment of the present disclosure.

FIGS. 7 and 8 illustrate adding an exchange wallet, a crypto wallet, a stable coin address, a central bank digital wallet, or an authentication application address to a profile, according to an example embodiment of the present disclosure.

FIGS. 10 and 11 illustrate how a password is reset, according to example embodiments of the present disclosure.

FIGS. 12 and 13 illustrate how a payment is approved, according to example embodiments of the present disclosure.

DETAILED DESCRIPTION

1.1 Hidden Response Request

Figure 9:
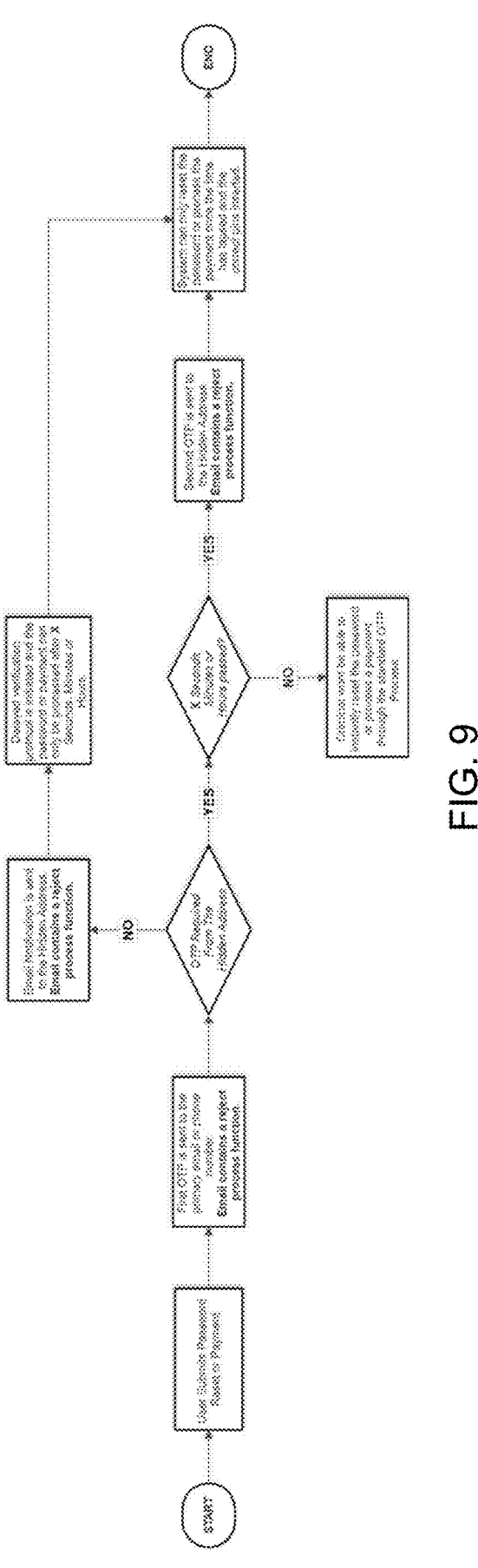
FIG. 9 illustrates a process diagram of a delayed verification protocol, according to an example embodiment of the present disclosure.

The solution provides a user verification system to verify whether a user of a secure system is authorised to access the secure system. The user verification systems comprises one or more processors and one or more computer memory storage means; stored instructions on the memory storage means for controlling the processor, to create a user profile for a user, which profile input fields require an email address and a cellular telephone number; and stored instructions on the memory storage means for controlling the processor, to login to the secure system and which secure system is set up to send a login verification means to the cellular device and a login verification means in the form of a hidden response request email, for example, to the hidden address.

The system also comprises a means to reset the user profile details or login details, in the form of stored instructions on the memory storage means for controlling the processor, and which secure system is set up to send a reset verification means to the cellular device and a reset verification means in the form of a hidden response request email to the hidden address.

This solution provides a user or business the ability to quickly adopt to risk by changing the one-time pin location or address at any time. A business can easily setup a new address to receive the one-time pins and update the location where the one-time pin is sent. These addresses will not be used as a primary address and is also not used to communicate with internal or external stakeholders.

This solution enables a user or business to insert a hidden address where the one-time pin will be sent to approve various business functions or transactions. Once the hidden address has been confirmed the address will be encrypted and locked from view.

In the event a criminal has gained access to a user's primary email, username, and password they would not be able to determine where the one-time pin was sent. This new protocol introduces a level of anonymity and prevents a criminal from exploiting a user or business. In order to view the address, the user will have to insert a pin which will unveil the hidden address and enable a user to update the location.

This solution enables a user or business to update the hidden address at any time to reduce cyber security risk and exposure. Companies can implement additional governance protocols where the address can be regularly updated on a monthly, quarterly, semi-annual, or annual basis.

Multiple addresses can be added to the profile in order to conform to a company's delegation of authority. Governance policies my dictate an approval limit of a certain employee, functions, or department. This solution will be able to cater for those scenarios.

This is not possible with the 2-step verification protocol since the user or business is using their primary email and phone number. This invention can be used as a stand-alone process or as an additional security measure on the 2-step verification process for high security platforms.

The hidden address that can be added to a user's or business profile can comprise the following:

1. Email Address or Multiple Email Addresses—A unique secured email that is not used as a primary address that will only receive the approval requests or one-time pins.
2. Authentication Application Addresses or Links—Unique link where the approval request or pin is sent to a secured application.
3. Cryptocurrency Exchange Wallet Address or Addresses.
4. Cryptocurrency Wallet Address or Addresses.
5. Central Bank Digital Wallet Address or Addresses
6. Stable Coin Exchange or Wallet Address or Addresses.
7. Digital Identity Profile Functions where this Protocol can be Beneficial:

1. System Login.
2. Payment Approvals.
3. New Beneficiary Approvals.
4. Approvals For Updating Beneficiary Banking Details.
5. Credit Card Transactions.
6. Password Reset Protocols.
7. User Verification.

1.2 Delayed Authentication

The response request is set up to time out after a selected number of minutes, being a delayed authentication or verification. In this example, a one-time pin is sent to a primary email and the hidden address in a specific time frame that is specified by the business or user.

The purpose of the delayed authentication is to delay a criminal from gaining instant access to reset a password or to approve a transaction when they have gained unlawful access through a phishing attack on the primary email and phone number.

The time frame that is specified can be in seconds, minutes or hours and is setup on the business or user's profile. The business or user can specify if a one-time pin must be sent to the hidden address or if the hidden address should be used as a notification centre.

Examples of how the Delayed Authentication can be Incorporated:

1. Password Reset
   1.1 When a user requests to reset the password the one-time pin is sent to the primary email address and to the hidden address in a specific time frame. In order to reset the password, the user will require both one-time pins in order to fulfil the request.
   Example—The first pin is sent to the primary email and after 30 min the second pin is sent to the hidden location.
   1.2 When a user requests to reset the password the one-time pin is sent to the primary email address and a notification is sent to the hidden address. Once the user adds the one time pin the request is only fulfilled within the time frame that is specified on the user's profile (e.g., 30 min). In the event the criminal has gained access to a user's primary email the user will receive the notification to the hidden address and will have enough time to respond to the request. The user can ignore the notification or reject the request through a prompt on the notification.

2. Payment Approvals.

2.1 When a user processes a payment the one-time pin is sent to the primary email address and to the hidden address in a specific time frame. In order to process the payment, the user will require both one-time pins in order to fulfil the request.

Example—The first pin is sent to the primary email and after 30 min the second pin is sent to the hidden location. A payment notification can also be sent to the hidden address to notify the user that there has been a payment request and both pins will be required. In the event the criminal has gained access to a user's primary email the user will receive the notification to the hidden address and will have enough time to respond to the request. The user can ignore the notification or reject the request through a prompt on the notification.

2.2 When a user processes a payment the one-time pin is sent to the primary email address and a notification is sent to the hidden email address.

Example—Once the user adds the one time pin the request is only fulfilled within the time frame that is specified on the user's profile (e.g., 30 min).

In the event the criminal has gained access to a user's primary email the user will receive the notification to the hidden address and will have enough time to respond to the request. The user can ignore the notification or reject the request through a prompt on the notification.

Diagrammatic Examples

FIG. 1:

In this example one address is added to a profile. The user or business has the option to choose which function the one-time pin is sent to.

FIG. 2:

Once the address is confirmed the address is hidden from view and unknown to a criminal if they have obtained access to the users' username, email, or password.

FIG. 3:

This example shows how multiple hidden addresses can be set up to receive the one-time pin to approve a process or financial transaction.

FIG. 4:

Once the address is confirmed the address is hidden from view and unknown to a criminal if they have obtained access to the users' username, email, or password.

FIG. 5:

In this example multiple users can be added to a user's profile to mitigate risk and improve governance on financial transactions and payments.

FIG. 6:

Once the address is confirmed the address is hidden from view and unknown to a criminal if they have obtained access to the users' username, email, or password.

FIG. 7:

In this example one exchange wallet, crypto wallet, stable coin address, central bank digital wallet or authentication application address is added to a profile. The user or business has the option to choose which function the one-time pin is sent to.

FIG. 8:

Once the address is confirmed the address is hidden from view and unknown to a criminal if they have obtained access to the users' username, email, or password.

FIG. 9:

This example shows a process diagram of the delayed verification protocol which comprises the primary email address and hidden address to approve a password reset request or to approve a payment.

FIG. 10 (Password Reset):

In this example, both one-time pins are required to approve a password reset function and a delay between both one-time pins is specified on the profile.

The first one-time pin is sent to the primary email address and the delay can be specified by the user before the second pin is sent to the hidden address. Both pins will be required in order to reset the password or to process a payment.

The hidden address can be an email address, authentication application address, cryptocurrency exchange wallet, cryptocurrency wallet address, central bank digital wallet address, stable coin exchange or wallet address.

FIG. 11 (Password Reset):

In this example, one pin is required and sent to the primary email address. The request can only be processed once the time delay on the profile has lapsed and a notification is sent to the hidden address one the pin to the primary email has triggered. The notification to the hidden address allows the user to accept or reject the request if the primary email, phone number or account has been compromised.

The hidden address can be an email address, authentication application address, cryptocurrency exchange wallet, cryptocurrency wallet address, central bank digital wallet address, stable coin exchange or wallet address.

FIG. 12 (Payments)

In this example, both one-time pins are required to approve a payment. The delayed verification is specified on the profile and the second pin is only sent to the hidden address after the specified time has lapsed.

The hidden address can be an email address, authentication application address, cryptocurrency exchange wallet, cryptocurrency wallet address, central bank digital wallet address, stable coin exchange or wallet address.

FIG. 13 (Payments)

In this example, a pin will be sent to the primary email and a notification will be sent to the hidden address to approve a payment. A notification will be sent to the hidden address and the payment will only be approved once the time delay has lapsed and the pin from the primary email has been inserted.

The hidden address can be an email address, authentication application address, cryptocurrency exchange wallet, cryptocurrency wallet address, central bank digital wallet address, stable coin exchange or wallet address.

It shall be understood that the examples are provided for illustrating the invention further and to assist a person skilled in the art with understanding the invention and are not meant to be construed as unduly limiting the reasonable scope of the invention.

The invention claimed is:

1. A user verification system to verify whether a user of a secure system is authorized to access the secure system, the user verification system comprising:

one or more processors and computer memory storage;

stored instructions on the computer memory storage configured to:

create a user profile for a user, wherein the profile includes a first address and one or more hidden addresses, each hidden address being assigned and authenticated by a business and concealed at login;

deliver a one-time pin or approval request to a hidden address for verifying the user's access or transaction; and periodically or dynamically update each hidden address with a new hidden address created and authenticated by the business to secure verification processes.

2. The system as claimed in claim 1, further comprising of stored instructions on the computer memory storage to perform a password or profile reset, wherein the secure system is configured to send a reset verification request to the first address and a reset one-time pin to the hidden address for verification.

3. The system as claimed in claim 1, wherein a login interface is configured to conceal the transmission of a one-time pin or approval request or any indication that the hidden address is being used.

4. The system as claimed in claim 1, wherein the one-time pin or approval request is a time-out response request.

5. The system as claimed in claim 1, wherein the one-time pin or approval request is sent in addition to visible verification steps or login verification requests.

6. The system as claimed in claim 1, wherein the one-time pin or approval request is sent to the hidden address and is in the form of an email, a mobile application notification and/or request for verification, or a message which comprises an OTP (one-time pin) or approval request.

7. The system as claimed in claim 1, wherein the stored instructions for creating or updating the user profile are configured to provide input fields for the first address and the one or more hidden addresses, the first address being the primary communication address, and the login interface is configured to conceal the hidden address during login, and wherein the system is configured to prompt the user to input a hidden address to strengthen security.

8. The system as claimed in claim 1, wherein the user verification system is configured to delay the one-time pin delivery or approval request.

9. The system as claimed in claim 1, wherein the user verification system is connected to a server loaded with a database which comprises compromised user contact details or suspicious IP addresses or features and configured to compare user information entered on the user's profile to determine if any information is flagged as compromised or suspicious and notify the user to require to suggest an input of a hidden address to strengthen the security.

10. The system as claimed in claim 1, wherein the hidden address is used as a notification means to issue notifications to the user, notifications comprising reject or approval requests, new password requests, resetting or changing the password messages, or compromise of private information alerts.

11. The system as claimed in claim 1, wherein a login page of the login verification means is configured to only display the hidden address after completion of a verification process after a one-time pin or approval request has been entered, and only for a single login session.

12. The system as claimed in claim 11, wherein the user verification system is configured to customize the verification steps and/or requirements to allow a user to select a security configuration associated with perceived security risks related to different types of transactions and prior compromised contact details.

13. The system as claimed in claim 1, wherein the hidden address is used as a notification means to issue notifications to the user, the notifications being used to send a pin, OTP, seed phrase, random words, letters, special characters, or combinations as part of a verification or password change or resetting process and a pin or similar is also sent to a first or primary address.

14. A method for verifying whether a user of a secure system is authorized to access the secure system, which method comprises the steps of:

creating a user profile for a user, wherein input fields are provided for a cellular telephone number and one or more hidden addresses, each hidden address being assigned and authenticated by a business and concealed at login;

sending a verification request to a cellular device of the user;

sending a one-time pin or approval request to the hidden address for a verification process selected from the group consisting of login and reset verification means; and periodically or dynamically updating each hidden address to a new hidden address created and authenticated by the business to secure the verification processes.

15. A method as claimed in claim 14, comprising a step of requesting the user during account profile creation or updating to enter and store, one or more hidden addresses and concealing each hidden address and the sending of any verification request to the hidden address at an associated login page.

16. A non-transitory computer-readable medium including one or more sequences of instructions which, when executed by one or more processors, causes said one or more processors to perform the method as claimed in claim 14.

* * * * *